US006970918B2

(12) United States Patent
Brown et al.

(10) Patent No.: US 6,970,918 B2
(45) Date of Patent: *Nov. 29, 2005

(54) SYSTEM AND METHOD FOR TRANSCODING SUPPORT OF WEB CONTENT OVER SECURE CONNECTIONS

(75) Inventors: Frances C. Brown, Austin, TX (US); Susan Crayne, Hartsdale, NY (US); Samuel R. Detweiler, Austin, TX (US); Peter Gustav Fairweather, Yorktown Heights, NY (US); Stephen Paul Farrell, San Francisco, CA (US); Vicki Lynne Hanson, Chappaqua, NY (US); Richard Scott Schwerdtfeger, Round Rock, TX (US); Beth Rush Tibbitts, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 741 days.

This patent is subject to a terminal disclaimer.

(21) Appl. No.: 09/962,000

(22) Filed: Sep. 24, 2001

(65) Prior Publication Data

US 2003/0061387 A1    Mar. 27, 2003

(51) Int. Cl.$^7$ .............................................. G06F 15/16
(52) U.S. Cl. ...................... 709/219; 709/203; 709/217; 709/218; 709/219
(58) Field of Search ........................ 709/225, 217, 709/246, 227, 203, 206, 207, 216, 219, 239; 713/200, 201, 150, 153

(56) References Cited

U.S. PATENT DOCUMENTS

| | | | |
|---|---|---|---|
| 5,673,322 A | * | 9/1997 | Pepe et al. ................... 709/219 |
| 5,727,159 A | * | 3/1998 | Kikinis ....................... 709/246 |
| 5,826,014 A | * | 10/1998 | Coley et al. ................. 713/201 |
| 5,918,013 A | | 6/1999 | Mighdoll et al. |
| 5,940,598 A | | 8/1999 | Strauss et al. |
| 5,983,273 A | | 11/1999 | White et al. |
| 5,996,022 A | | 11/1999 | Krueger et al. |
| 6,009,103 A | | 12/1999 | Woundy |
| 6,038,595 A | | 3/2000 | Ortony |
| 6,055,275 A | | 4/2000 | Pinier et al. |
| 6,061,798 A | * | 5/2000 | Coley et al. ................. 713/201 |
| 6,073,168 A | | 6/2000 | Mighdoll et al. |

(Continued)

FOREIGN PATENT DOCUMENTS

GB         2 346 238 A       2/2000

(Continued)

OTHER PUBLICATIONS

"A Process for Selective Routing of Servlet Content to Trancoding Modules", Research Disclosure, (Jun. 1999/889), IBM Corporation, pp. 889-890.

(Continued)

*Primary Examiner*—Valencia Martin-Wallace
*Assistant Examiner*—Ajay M. Bhatia
(74) *Attorney, Agent, or Firm*—Robert M. Carwell; Dillon & Yudell LLP (57) ABSTRACT

A method and system using for establishing an intermediary connection between a client device and a secure website using a web proxy machine. In the preferred embodiment, a secure connection is established between the web proxy and the secure content server. A response from the content server, typically in HTML format, is sent to the proxy machine through a secure connection. The proxy machine is then able to manipulate the secure response from the secure server, in ways such as transcoding the response to a format readable by the user device, storing sensitive financial data in cookies in the proxy machine, and to return a response from the content provider to the client device with or preferably without cookies.

24 Claims, 5 Drawing Sheets

U.S. PATENT DOCUMENTS

| | | | |
|---|---|---|---|
| 6,138,150 | A | 10/2000 | Nichols et al. |
| 6,199,144 | B1 | 3/2001 | White et al. |
| 6,233,577 | B1 * | 5/2001 | Ramasubramani et al. ..... 707/9 |
| 6,324,648 | B1 * | 11/2001 | Grantges, Jr. ................ 713/201 |
| 6,430,624 | B1 * | 8/2002 | Jamtgaard et al. ........... 709/246 |
| 6,496,931 | B1 * | 12/2002 | Rajchel et al. ............... 713/168 |
| 6,510,464 | B1 * | 1/2003 | Grantges et al. ............ 709/225 |
| 6,812,941 | B1 * | 11/2004 | Brown et al. ................ 715/854 |
| 6,829,746 | B1 * | 12/2004 | Schwerdtfeger et al. ..... 715/523 |
| 6,880,014 | B2 * | 4/2005 | Brown et al. ................ 709/227 |
| 2001/0029496 | A1 * | 10/2001 | Otto et al. ..................... 705/74 |
| 2002/0161904 | A1 * | 10/2002 | Tredoux et al. ............. 709/229 |
| 2003/0061275 | A1 * | 3/2003 | Brown et al. ................ 709/203 |
| 2003/0061288 | A1 * | 3/2003 | Brown et al. ................ 709/206 |
| 2003/0061299 | A1 * | 3/2003 | Brown et al. ................ 709/214 |
| 2003/0061309 | A1 * | 3/2003 | Brown et al. ................ 709/218 |
| 2003/0061317 | A1 * | 3/2003 | Brown et al. ................ 709/221 |
| 2003/0061386 | A1 * | 3/2003 | Brown et al. ................ 709/246 |
| 2003/0061387 | A1 * | 3/2003 | Brown et al. ................ 709/246 |
| 2003/0158889 | A1 * | 8/2003 | Massarani et al. .......... 709/203 |
| 2003/0177196 | A1 * | 9/2003 | Bhasin et al. ............... 709/213 |
| 2003/0182424 | A1 * | 9/2003 | Odendahl ................... 709/225 |
| 2004/0117216 | A1 * | 6/2004 | Dutta et al. ..................... 705/4 |
| 2004/0230820 | A1 * | 11/2004 | Hui Hsu et al. ............ 713/200 |
| 2005/0066011 | A1 * | 3/2005 | Wicks ........................ 709/217 |

FOREIGN PATENT DOCUMENTS

| | | | | |
|---|---|---|---|---|
| WO | WO 99/64967 | * 12/1999 | ........... G06F 17/30 |
| WO | WO 00/03525 | 1/2000 | |
| WO | WO 00/49530 | 8/2000 | |

OTHER PUBLICATIONS

Network Working Group, RFC 2616.

"A Process for the Blending of Web Content", International Business Machines Research Disclosure, pp. 778-779, Apr. 2000.

"A Process for Optimized Applications of XSL Stylesheets for Use with Partially Static XML Data Streams", International Business Machines Research Disclosure, pp. 784-785, Apr. 2000.

"4-Tier Check image Distribution System", International Business Machines Research Disclosure, pp. 722-724, May 1999.

* cited by examiner

SYSTEM AND METHOD FOR TRANSCODING SUPPORT OF WEB CONTENT OVER SECURE CONNECTIONS

CROSS-REFERENCE TO RELATED APPLICATIONS

The present application is related to the following copending application, which is filed on even date herewith and incorporated herein by reference:

The present application is related to the following copending application, which is filed on even date herewith and incorporated herein by reference: U.S. patent application Ser. No. 09/961,896.

BACKGROUND OF THE INVENTION

1. Technical Field

The present invention relates in general to the field of computer networks, and, in particular, to the connection between a user client device and a content server. Still more particularly, the present invention relates to an improved method and system for accessing secure connection data by establishing a secure port connection between a client device and a secure content server through an intermediary proxy machine.

2. Description of the Related Art

The Internet comprises a vast network of heterogenous computers and subnetworks all communicating together to allow for global exchange of information. The World Wide Web (WWW) is one of the more popular information services on the Internet. The WWW uses browser software to decipher HyperText links to other documents or files located on remote computers, all of which are connected to the Internet. Browsers provide a user-friendly interface that allows users to easily navigate from site to site or file to file around the Internet. Using a browser, a user can access information in the form of text, audio, video, still pictures and related multimedia stored on remote computers or content servers.

Figure 1:
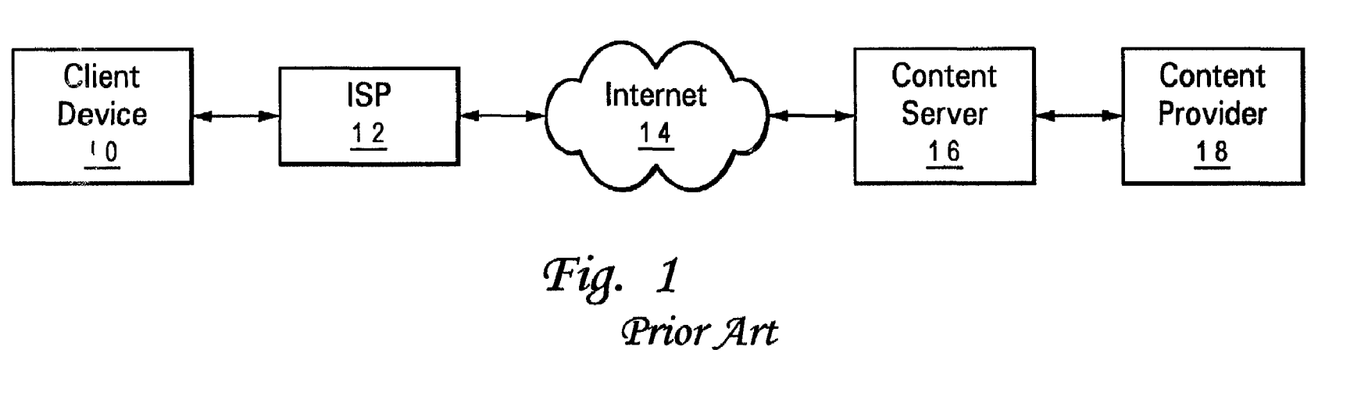
FIG. 1 depicts a block diagram of Internet connections as used in prior art.

FIG. 1 is a block diagram of the Internet and other devices that may be used to access the Internet. A client device 10, such as a desktop computer, laptop computer, personal digital assistant (PDA), onboard vehicle computer, cellular telephone, etc., sends a request for a Web site, typically under the HyperText Transfer Protocol (HTTP) to an Internet Service Provider (ISP) 12. ISP 12 establishes a link to an Internet 14, which then passes the HTTP request to a content server 16. This request is forwarded to a content provider 18 that is typically a web page addressed by a Uniform Resource Indicator (URI) such as a Uniform Resource Locator (URL).

The response from client device 16 is typically in the language of HyperText Markup Language (HTML) that is the standard language for creating documents on the World Wide Web (WWW). HTML defines the structure and layout of a web document by using a variety of tag commands inserted in the document to specify how the document, or portion of the document, should be formatted. The response from content provider 18, is routed back through content server 16, Internet 14, and ISP 12 to client device 10.

The user of client device 10 may send a request to a secure server, which is a content server 16 that supports any of the major security protocols that encrypt and decrypt messages to protect them against third-party tampering. For example, a user making a purchase over the Internet would want information regarding credit card numbers and other financial details to be inaccessible to outside hackers. A typical protocol for such a connection is the Secure Sockets Layer (SSL) protocol, which uses a public key. A key is typically a table needed to decipher any coded data, and is accessed only by providing the proper password, which is typically user defined. By convention, web pages that require an SSL connection start with the URL address of "https:" instead of "http:". It is understood that the socket of an SSL is typically a software object, not a physical component of a computer system.

One reason for secure connections to be used is so that persistent state data (persistent client state data), which is more commonly known as an Internet "cookie," may be securely sent back to the user of client device 10. Stored in the cookie will be confidential information for the user such as credit card numbers, past purchases made from a specific content provider, etc. The cookie is typically in a protocol header message given to the client web browser, such as Netscape Navigator or Internet Explorer, by a web server, which is a computer that delivers web pages from the Uniform Resource Locator (URL) identified content provider request by the user. The protocol header consists of a string of characters (cookie content) that is inserted by a web server operated by an Internet content provider (ICP) into the random access memory (RAM) of the user's computer (client) while the user is operating a browser (application program) to access web pages. Cookies that have been sent by an ICP are held in the RAM of the user's computer while the user is communicating with the ICP. The cookies are then stored on the hard drive of the user's computer if their lifetime is longer than the time the user spends at the ICP's Web site.

Secure connections in the prior art between content provider 18 and client device 10, as depicted in FIG. 1, establish the requirement that the connection be inaccessible to any third party. Therefore, any cookies for a specific content provider for a specific user of client device 10 are typically stored on the client device 10 presently being used. If the user should then go to a different client device 10, such as his laptop or another public computer terminal, the user would not have access to the cookies that were stored in the user's client device 10 that established the original secure connection with content provider 18. The user would have to establish a secure connection between the new client device and content provider 18, and set up a new cookie file in the new client device.

Another problem found in the prior art is in the process of transcoding content from the content provider 18 to client device 10. Typically, a response from a web page is conventionally formatted via standard page description language such as HTML, which contains text and can reference graphics, sound, animation and video data. If the client device is a wireless device that requires content to be received in the wireless application protocol (WAP), such content would need to be transcoded from HTML into WAP. However, since there is a secure connection between content provider 18 and client device 10, the transcoder cannot intervene and the content will be conveyed back to client device 10 in an unreadable format.

It should therefore be apparent that there exists a need for a method that will allow for intervention of data being delivered across secure Internet connections. It would further be desirable to devise a computer program product wherein such a method may be performed on a computer system. In addition, it would be desirable to devise a proxy machine having the ability to allow data being transmitted across secure Internet connections to be captured for transcoding or other manipulation.

SUMMARY OF THE INVENTION

The present invention is a method and system for using a web proxy machine to establish an intermediary secure connection between a user device and a secure content server. A response from the content server, typically in HTML format, is sent to the proxy machine through a secure connection. The proxy machine is then able to manipulate the secure response from the secure server, in ways such as transcoding the response to a format readable by the user device and storing sensitive financial data in cookies in the proxy machine, and then to return a response from the content provider to the client device with or preferably without cookies.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as the preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2A:
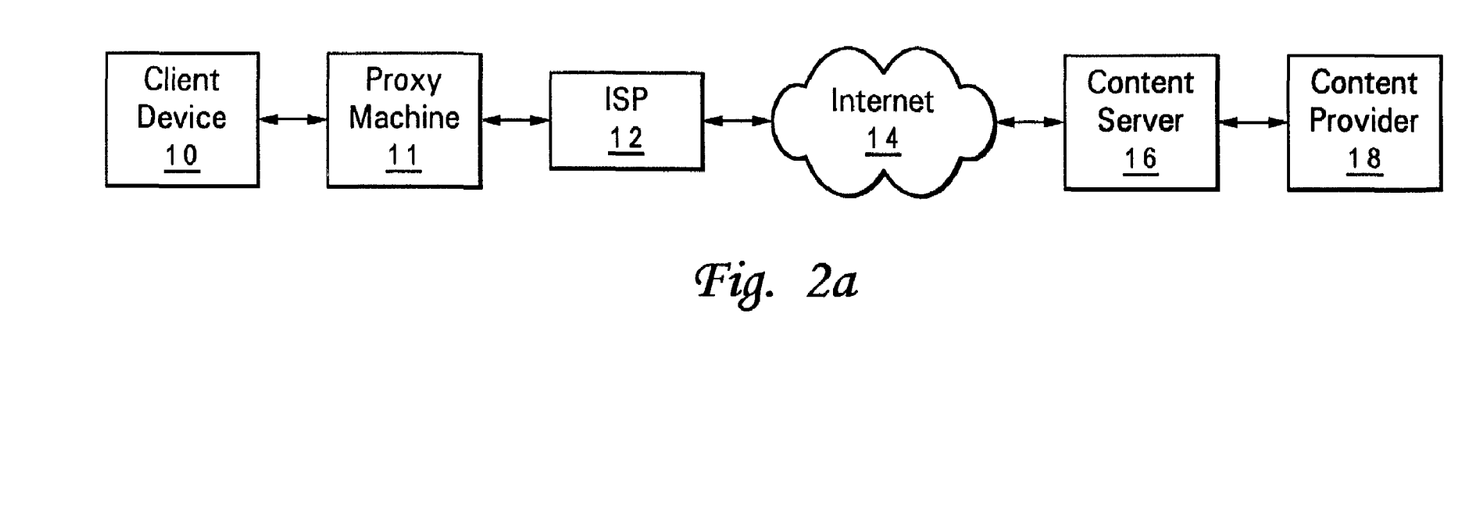
FIGS. 2a and 2b illustrate a block diagram of an Internet connection as used in the preferred embodiment of the present invention.

With reference now to FIG. 2a, there is depicted a block diagram of a preferred Internet connection between client device 10 and content provider 18 via content server 16. As described in further detail below and illustrated in FIG. 2b, content provider 18 and content server 16 may be secure or non-secure, depending on their accessibility and function to proxy machine 11. Client device 10 may be a network connected device connected through a local-area network (LAN) or wide-area network (WAN), which LAN/WAN connects directly to proxy machine 11. In the preferred embodiment of the present invention, proxy machine 11 functions both as a web server as well as a web browser, as will be understood below in this description. Client device 10 may be a desktop computer, laptop computer, set top box (Internet access device for use with a television monitor), Personal Digital Assistant (PDA), Automatic Teller Machine (ATM), computer kiosk or like device. In addition, client device 10 may be a cellular telephone, which typically is connected through a Public Switched Telephone Network (PSTN) which connects the cellular telephone to proxy machine 11, either directly or through the LAN/WAN.

Figure 3:
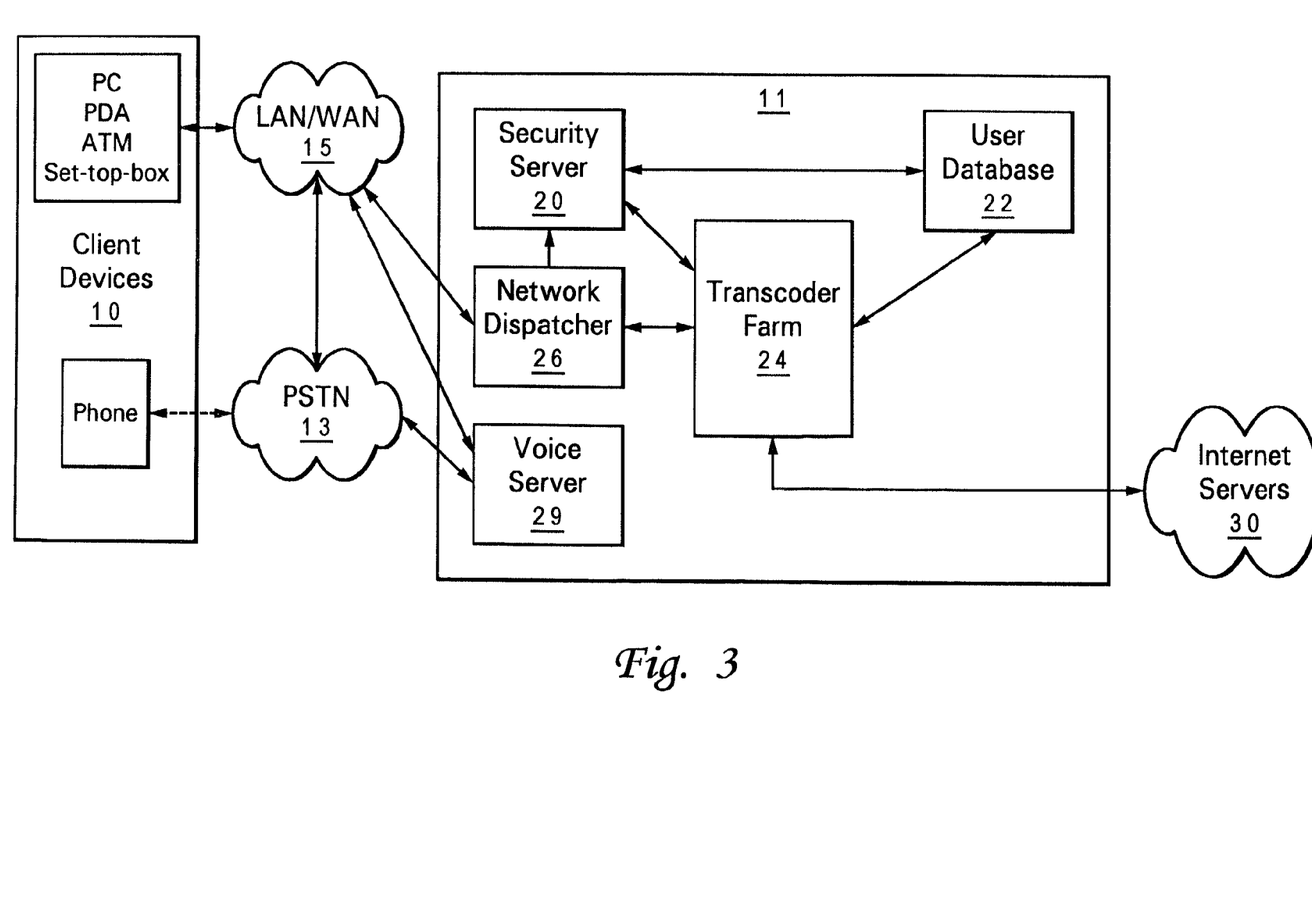
FIG. 3 depicts a block diagram of a proxy machine used in the preferred embodiment of the present invention.

As shown in further detail in FIG. 3, proxy machine 11 in the preferred embodiment performs many functions. Proxy machine 11 connects client device 10, as described above, to Internet servers 30, which may be an Internet Service Provider (ISP), Internet Content Provider (ICP), or other similar gateway devices. Proxy machine 11 acts as a web server and/or browser that is intermediate to client device 10 and Internet server 30, which provides the content from the content provider 18, as shown in FIG. 2a. Referencing again FIG. 3, access to proxy machine 11 may be through a direct Internet connection, or staged using different communication medium, such as a Local Area Network/Wide Area Network LAN/WAN 15. Also, a telephone may require transmission through a Public Switched Telephone Network PSTN 13 to a voice server 29, either directly or through LAN/WAN 15. Requests entering proxy machine 11 are routed, for load balancing, through network dispatcher 26. After routing has been determined, the requests are passed to a designated transcoder in transcoder farm 24. At the transcoding machine, user information passed in the request from client device 10 is authenticated by security server 20 based on the stored user set of protocol. If the user is not known or invalid, proxy machine 11 may direct the client device's 10 user agent (browser) to authenticate the user by prompting for a user I.D. and password. This information is then passed back as part of the request for validation.

Once a user has been validated, the request for information is sent to Internet server 30. The returned response, typically in HTML format, is then returned to a designated transcoder in transcoder farm 24. The designated transcoder will then query user database 22 for user profile information. In the preferred embodiment, this profile information is delivered through an eXtensible Markup Language (XML) transcoding directive which provides directives to the transcoder showing the user's preferred transcoding order, format, etc. The designated transcoder will then apply the transformation and send the content back to client device 10. The transcoding software in proxy machine 11 is preferably designed to handle dynamic transcoding. To do this, each transcoder stores the document retrieved in browser form for manipulation by each of the desired transformations. Functioning as a browser, proxy machine 11 works to separate content, data, and executable script for manipulation by the transcoder in transcoder farm 24.

Figure 4:
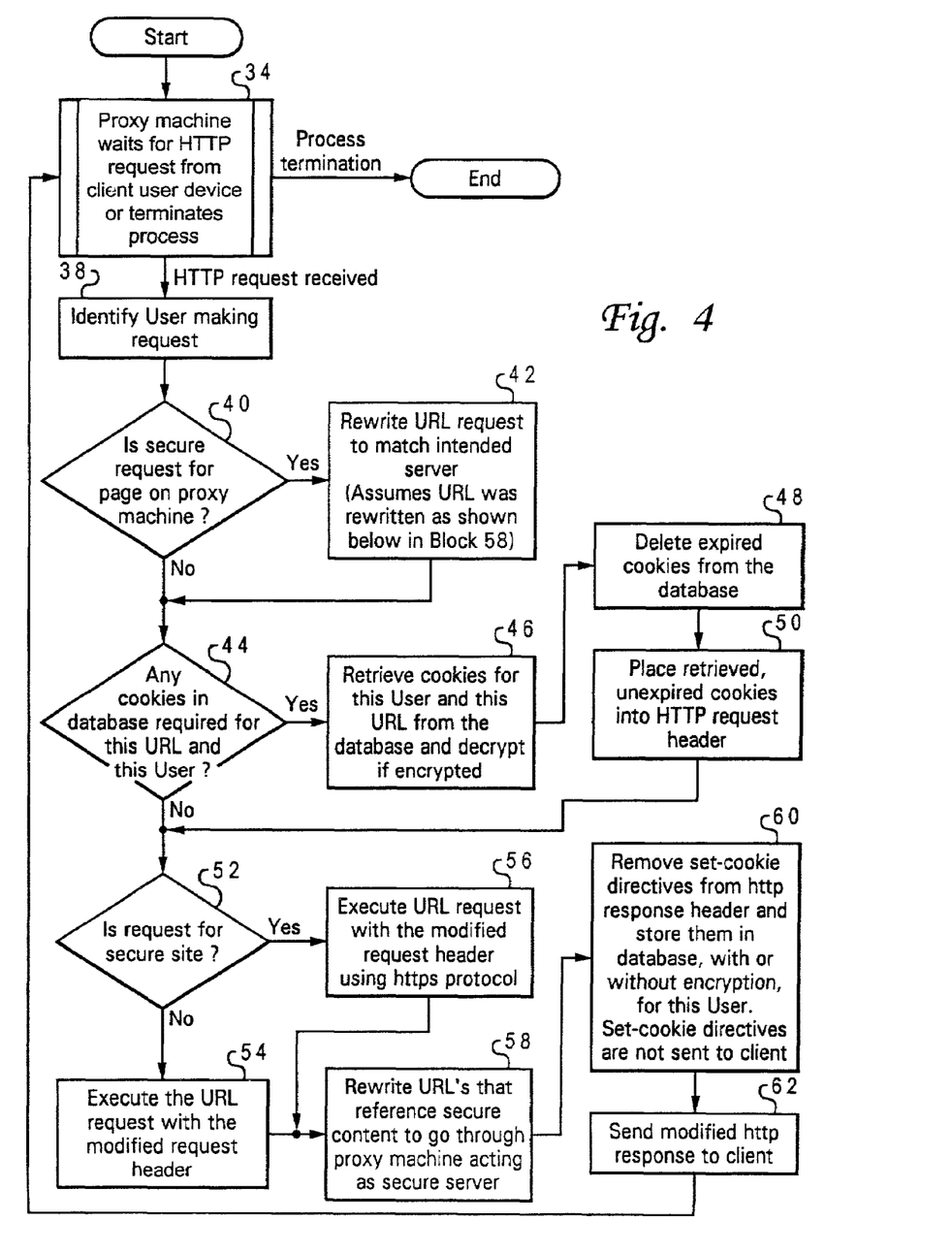
FIG. 4 illustrates a high-level logic flow diagram that depicts interception by an intermediary proxy machine of content delivered over secured connections.

A high-level view of the process used in the preferred embodiment of the invention is depicted in FIG. 4. Proxy machine 11 waits for an HTTP request from the client until it either receives the request, or proxy machine 11 is instructed to terminate the process of polling for a request, as shown in block 34. If an HTTP (or secure request such as an HTTPS formatted request) is received by proxy machine 11, the user making the request is identified, as depicted in block 38. This user identification may be performed using any method known in the art, including searching any cookies in the HTTP header or examining the pathway showing the Internet Protocol (IP) address from which the request originated. Optionally, a query response back to the user may be initiated by the proxy machine 11 to establish the user's identification and authorization.

After the user is identified and authenticated, a query, as illustrated in block 40, is made as to whether the URL request is for a page that is stored in a location accessible to proxy machine 11, either as part of proxy machine 11 or at a remote storage site. The process through which the intended URL was previously rewritten to direct the request through the proxy URL for proxy machine 11 is described below for block 58. As illustrated in block 42, if the request is for a web page stored, typically in a cache memory, on proxy machine 11, the URL request is rewritten to match the intended proxy machine server 11 as a web server or secure web server. For example, if the URL request was for:
GET
https://proxy.austin.ibm.com/
sroute?source=www.us.buy.com/accountaccess, "source" identifies the data for the URL of the desired web page, which in this example would be:
www.us.buy.com/accountaccess If the intended server's URL had not been previously rewritten as described below for block 58, then the URL as addressed by the user client would be directly accessed.

As illustrated in block 44, a query is made to determine whether any cookies for the requested web page are stored in a database accessible to proxy machine 11. If so, the cookies are retrieved from the cookie database and decrypted if encrypted, as illustrated in block 46. Any expired cookies for that user and URL are deleted from the cookie database, as shown in block 48. As illustrated in block 50, the retrieved, unexpired cookies are then placed into the HTTP(S) request header so they may be transmitted to the content server 16 when the request is made by proxy machine 11.

Once the unexpired cookies, if any, are placed in the HTTP(S) request header, a query is made, as shown in block 52, as to whether the request is to a secure website. If so, the URL request to content server 16 is executed only after the URL request is modified using a security protocol, preferably HTTPS, as shown in block 56. The request encryption is performed using any of the major security protocols, such as Secure Sockets Layer (SSL), Secure HyperText Transfer Protocol (S-HTTP), or IP security. The request is directed to a secure socket port, public and private keys invoked, a validation certificate obtained, etc. If the request is not to a secure site, then the URL request is made directly to the content server without encryption as depicted in block 54.

Figure 2B:
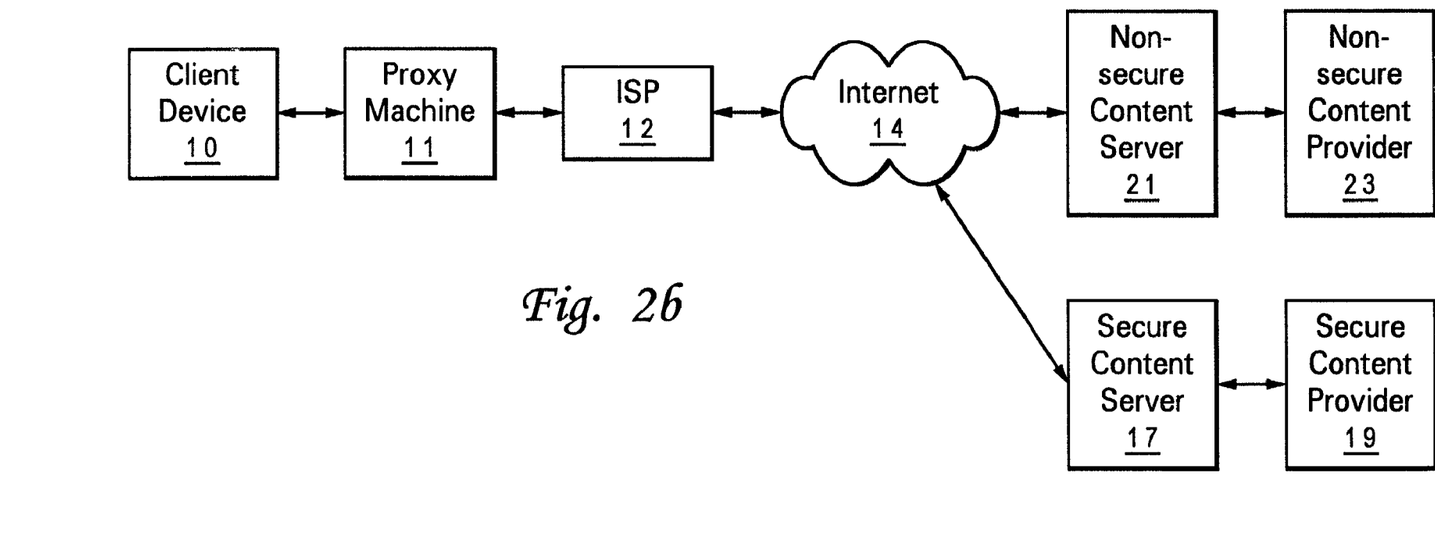

Proxy machine 11 functions in block 54 and block 56 as a proxy browser for client device 10, and makes a connection with content server 16 to an authorized web page, which may be either a non-secure web site or a secure site previously captured by proxy machine 11 as described in block 58 and further illustrated in FIG. 2b. Content server 16, depicted in FIG. 2a, may be either a non-secure content server 21 or a secure content server 17, as shown in FIG. 2b. Content provider 18, illustrated in FIG. 2a, may be either a non-secure content provider 23 associated with non-secure content server 21, or a secure content provider 19 associated with secure content server 17, shown in FIG. 2b. Proxy machine 11 can make a connection to non-secure content provider 23 via non-secure content server 21, or proxy machine 11 can make a connection to secure content provider 19 via secure content server 17. In the preferred embodiment of the process depicted in block 58 of FIG. 4, only URL's that reference secure content associated with a secure content provider 19 are rewritten to go through proxy machine 11, which is acting as a secure proxy server. All transmittals from the intended content server 16 are made to proxy machine 11, which tracks and correlates a connection with the intended content server 16 preferably with a specific user of client device 10. These correlations are preferably according to identifiers stored as described above in the process depicted in block 38. All URL's related to secure web sites are rewritten by proxy machine 11, as illustrated in block 58. These URL's include the URL of the secure web page addressed by the HTTP request of the user, plus any secure website URL's accessible through links on that web page. For example, if the intended server was for the web page:
https://www.us.buy.com/checkout this URL would be rewritten to redirect the secure page request to page request through proxy machine 11, as described in block 58, by proxy machine 11 as:
https://proxy.austin.ibm.com/
sroute?source=www.us.buy.com/checkout This transcoding of the URL will result in future requests from a specific user, through any client device 10, for
https://proxy.austin.ibm.com/
sroute?source=www.us.buy.com/checkout to be transcoded internally by proxy machine 11 to
https://www.us.buy.com/checkout to establish a proxy connection between proxy machine 11 and the intended content server 16 and to fetch the intended page for transcoding. In addition, any other secure links on that page, such as a link to another shopping page, payment verification, etc., would also have their URL's rewritten as shown above to redirect secure page requests through proxy server 10.

After all URL's that reference secure content are rewritten to be accessed through proxy machine 11 (acting as a secure server), the set-cookie directives from the HTTP header are removed and stored in a cookie database that is accessible to proxy machine 11, as depicted in block 60. The cookie database identifies the cookie stored by the user and the content web page being accessed by that user. The modified HTTP response, without the cookies and having the modified HTTPS URL's directing their access through proxy machine 11, as described above referencing the intended server, is then sent back to client device 10 as illustrated in block 62. If the original URL request was for a secure page, the response is preferably sent back to user device 10 through a secure connection, such as though an SSL protocol, and encrypted using art readily understood by those skilled in the art.

Figure 5:
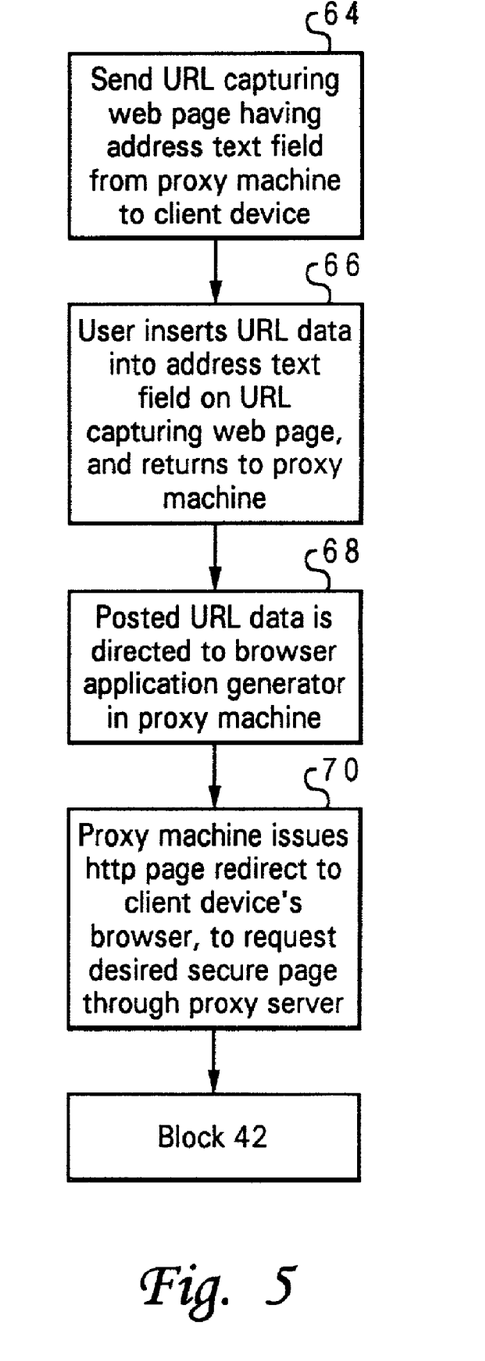
FIG. 5 depicts a high-level logic flow diagram that illustrates a preferred embodiment of directing a request to a secure URL though an address text field in a web page generated by a proxy machine.

If user device 10 were to try to access a secure web page through proxy machine 11 by simply typing in the secure page's URI (if not residing on the proxy machine), an error will typically occur since proxy machine 11 would not be able to decrypt the request from user device 10. However, such a link can be established through the use of a URI capturing web page generated by proxy machine 11 that is sent to user device 10, as depicted in FIG. 5 at block 64. This URI capturing web page has an address text field, injected in a form on the page during transcoding, in which the user inserts the desired URI, as depicted in block 66. The secure URI is captured by proxy machine 11 from the web page, and then modified to go through proxy machine 11 using the process described in block 58 of FIG. 4 and depicted in block 68 of FIG. 5. As illustrated in block 70 of FIG. 5, proxy machine 11 then issues an HTTP redirect response code back to the user agent of client device 10, and the user agent then requests the secure web page from proxy machine 11 as described in FIG. 4 at block 42.

The present invention thus establishes a connection between client device 10 and proxy machine 11 in which proxy machine 11 functions as a proxy server for content server 16, so client device 10 communicates with proxy machine 11 as though it were communicating with web content server 16. Proxy machine 11 also functions as a proxy browser for the user browser of client device 10, so that web content server 16 functionally communicates as if it were communicating with the browser of client device 10. Since both communications are typically secure in the preferred embodiment (client device 10 with proxy machine 11, and proxy machine 11 with content server 16), proxy machine 11 must encode/decode communications both with client device 10 as well as content server 16. Thus, communication from client device 10 received at proxy machine 11 (acting as a proxy server) must first be decoded before being encoded by proxy machine 11 (acting as a proxy browser) for secure communication with content server 16. Similarly, encoded communications from content server 16 must first be decoded before being encoded for transmittal to client device 10.

The above process allows a user to access a secure website while allowing proxy machine 11 to manage the content of the secure website and any cookies. Allowing the proxy machine 11 to have access and control of the secure website has multiple benefits. First, since the content of the secure content web page is available for manipulation, that content can be transcoded for accessibility, use by different devices, or any other purpose associated with transcoding. For example, transcoding may be provided to transform the display style of the response, such as different font, different background, etc. for disabled user accessibility. To use the content on different devices, transcoding may translate the HTML response from content server 16 into a protocol style understood by the particular client device 10. For example, if client device 10 is a hand-held wireless device such as a mobile phone, pager, two-way radio, smart phone or communicator, the content would need to be transcoded into a language such as Wireless Markup Language (WML).

Second, allowing the proxy machine 11 to have access and control of the secure website allows the same set of cookies to be used on different client devices 10 being used by the same user. The client can utilize the same cookies set for a specific content provider, including those specific for a particular transaction session. For example, is a specific user is in the middle of an e-commerce transaction, and chooses to end the session before completion, she can resume the activity later at any client device 10, including another similar device or another type of device. Thus, if she were using her desktop computer to initiate a session, she could continue it later from the same desktop computer, a similar desktop computer at another location, her laptop computer, or even a different platform such as a PDA. As proxy machine 11 has access to content provider 18, it can manipulate the content (including cookie information) and its display in any way desired.

It is understood and appreciated that instructions from a content provider directing that the content provided is not to be transcoded or similarly manipulated should be honored. For example, a "no-transform directive" in an HTTP header or similar instructions should be followed, and the content not transcoded or similarly manipulated according to the instructions of the content provider. A description that is illustrative of such an instruction is found in Section 14.9.5 of the 1999 Network Working Group's HyperText Transfer Protocol HTTP/1.1.

While the invention has been particularly shown and described with reference to a preferred embodiment, it will be understood by those skilled in the art that various changes in form and detail may be made therein without departing from the spirit and scope of the invention.

What is claimed is:

1. A method for establishing a secure connection between a user device and a secure content server, said method comprising:
   connecting a proxy machine between a user device and a plurality of content servers, wherein the plurality of content servers comprises a secure content server and a non-secure content server;
   receiving information from one of the content servers at the proxy machine, said proxy machine having access to a plurality of transcoders and a directive script database;
   receiving at the proxy machine cookies for a specific user from a specific content provider;
   storing the received cookies in the proxy machine;
   transcoding in the proxy machine the received information from said one of the content servers into a transcoded response by at least one of the plurality of transcoders according to at least one directive script from the directive script database, wherein said at least one directive script selectively defines at least one transcoding property of at least one transcoder within the plurality of transcoders;
   directing, according to the at least one directive script, which of said at least one transcoder are to be run;
   directing, according to the at least one directive script, what order said at least one transcoder are to be run; and
   sending the transcoded response to the user device.

2. The method of claim 1, further comprising:
   assigning a user identity, from a database of user identities, to identify the connection between the proxy machine and the secure content server.

3. The method of claim 2, wherein the user identity is defined by an Internet Protocol address for the user device.

4. The method of claim 2, wherein the user identity is defined in a cookie in an HTTP header.

5. The method of claim 1, further comprising:
   retrieving the cookies for the specific user for the specific content provider from the cookie database;
   deleting any expired cookies from the cookie database; and
   placing the retrieved unexpired cookies into an HTTP request header from the proxy machine to the secure content server.

6. The method of claim 1, wherein the established connection between the user device and the proxy machine is secure.

7. The method of claim 1, where said step of accessing through the proxy machine the authorized web page further comprises:
   sending a URI capturing web page from the proxy machine to the user device, said URI capturing web page having an address text field;
   entering a desired URI address in the address text field in the URI capturing web page; and
   directing the entered URI address to a browser application generator in the proxy machine.

8. The method of claim 1, further comprising transcoding the web page response from the secure content server into a protocol understood by the user device.

9. A system for establishing a secure connection between a user device and a secure content server, said system comprising:
   means for connecting a proxy machine between a user device and a plurality of content servers, wherein the plurality of content servers comprises a secure content server and a non-secure content server;

means for receiving information from one of the content servers at the proxy machine, said proxy machine having access to a plurality of transcoders and a directive script database;

means for receiving at the proxy machine cookies for a specific user from a specific content provider;

means for storing the received cookies in the proxy machine;

means for transcoding in the proxy machine the received information from said one of the content servers into a transcoded response by at least one of the plurality of transcoders according to at least one directive script from the directive script database, wherein said at least one directive script selectively defines at least one transcoding property of at least one transcoder within the plurality of transcoders;

means for directing, according to the at least one directive script, which of said at least one transcoder are to be run; and means for directing, according to the at least one directive script, what order said at least one transcoder are to be run; and sending the transcoded response to the user device.

10. The system of claim 9, further comprising means for assigning a user identity, from a database of user identities, to identify the connection between the proxy machine and the secure content server.

11. The system of claim 10, wherein the user identity is defined by an Internet Protocol address for the user device.

12. The system of claim 10, wherein the user identity is defined in a cookie in an HTTP header.

13. The system of claim 9, further comprising:

means for retrieving the cookies for the specific user for the specific content provider from the cookie database;

means for deleting any expired cookies from the cookie database; and means for placing the retrieved unexpired cookies into an HTTP request header from the proxy machine to the secure content server.

14. The system of claim 9, wherein said established connection between the user device and the proxy machine is secure.

15. The system of claim 9, wherein said means for accessing through the proxy machine the authorized web page further comprises:

means for sending a URI capturing web page from the proxy machine to the user device, said URI capturing web page having an address text field;

means for entering a desired URI address in the address text field in the URI capturing web page; and means for directing the entered URI address to a browser application generator in the proxy machine.

16. The system of claim 9, further comprising means for transcoding the web page response from the secure content server into a protocol understood by the user device.

17. A computer program product embodied on a tangible computer-readable medium for establishing a secure connection between a user device and a secure content server, said computer program product comprising:

computer program code for connecting a proxy machine between a user device and a plurality of content servers, wherein the plurality of content servers comprises a secure content server and a non-secure content server;

computer program code for receiving information from one of the content servers at the proxy machine, said proxy machine having access to a plurality of transcoders and a directive script database;

computer program code for receiving at the proxy machine cookies for a specific user from a specific content provider;

computer program code for storing the received cookies in the proxy machine;

computer program code for transcoding in the proxy machine the received information from said one of the content servers into a transcoded response by at least one of the plurality of transcoders according to at least one directive script from the directive script database, wherein said at least one directive script selectively defines at least one transcoding property of at least one transcoder within the plurality of transcoders;

computer program code for directing, according to the at least one directive script, which of said at least one transcoder are to be run;

computer program code for directing, according to the at least one directive script, what order said at least one transcoder are to be run; and computer program code for sending the transcoded response to the user device.

18. The computer program product embodied on a tangible computer-readable medium of claim 17, further comprising program code for assigning a user identity, from a database of user identities, to identify the connection between the proxy machine and the secure content server.

19. The computer program product embodied on a tangible computer-readable medium of claim 18, wherein the user identity is defined by an Internet Protocol address for the user device.

20. The computer program product embodied on a tangible computer-readable medium of claim 18, wherein the user identity is defined in a cookie in an HTTP header.

21. The computer program product embodied on a tangible computer-readable medium of claim 17, further comprising:

computer program code for retrieving the cookies for the specific user for the specific content provider from the cookie database;

computer program code for deleting any expired cookies from the cookie database; and computer program code for placing the retrieved unexpired cookies into an HTTP request header from the proxy machine to the secure content server.

22. The computer program product embodied on a tangible computer-readable medium of claim 17, wherein the connection between the user device and the proxy machine is secure.

23. The computer program product embodied on a tangible computer-readable medium of claim 17, wherein the computer program code for accessing through the proxy machine the authorized web page further comprises:

computer program code for sending a URI capturing web page from the proxy machine to the user device, said URI capturing web page having an address text field;

computer program code for entering a desired URI address in the address text field in the URI capturing web page; and computer program code for directing the entered URI address to a browser application generator in the proxy machine.

24. The computer program product embodied on a tangible computer-readable medium of claim 17, further comprising computer program code for transcoding the web page response from the secure content server into a protocol understood by the user device.

* * * * *